(12) United States Patent
Dempster et al.

(10) Patent No.: US 10,778,849 B2
(45) Date of Patent: Sep. 15, 2020

(54) CUSTOMIZED SERVICE PLAN GENERATION

(71) Applicant: T-Mobile USA, Inc., Bellevue, WA (US)

(72) Inventors: David Malone Dempster, Bothell, WA (US); Stacy Lynn Milligan, Frisco, TX (US); Benjamin Zachary White, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/887,943

(22) Filed: Feb. 2, 2018

(65) Prior Publication Data

US 2019/0245979 A1 Aug. 8, 2019

(51) Int. Cl.
*H04M 15/00* (2006.01)
*H04W 4/24* (2018.01)

(52) U.S. Cl.
CPC ........... *H04M 15/42* (2013.01); *H04M 15/70* (2013.01); *H04M 15/72* (2013.01); *H04M 15/725* (2013.01); *H04M 15/80* (2013.01); *H04M 15/8022* (2013.01); *H04W 4/24* (2013.01); *H04M 2215/0152* (2013.01); *H04M 2215/32* (2013.01)

(58) Field of Classification Search
CPC ......... H04W 4/24; H04W 12/06; H04W 4/35; H04W 4/60; G06Q 20/22; G06Q 30/016; G06Q 30/0207; G06Q 20/20; G06Q 30/0269; G06Q 30/0601; G06Q 30/0641; G06Q 40/08; G06Q 30/0206; G06Q 10/00; G06Q 20/127; G06Q 30/018; G06Q 30/0222; G06Q 30/0258; G06C 30/0269; G06C 30/0601; G06C 30/0641; H04M 15/42; H04M 2215/0152; H04M 2215/32; H04M 15/00; H04M 15/80; H04L 41/22
See application file for complete search history.

(56) References Cited

U.S. PATENT DOCUMENTS 8,315,594 B1 * 11/2012 Mauser ............... H04L 12/1492
455/406
8,538,379 B1 * 9/2013 Stachiw ................ H04M 15/43
379/114.01

(Continued)

*Primary Examiner* — Daniel Lai
(74) *Attorney, Agent, or Firm* — Knobbe Martens Olson & Bear LLP

(57) ABSTRACT

Systems, methods, and computer-readable media are described for generating customized service plans for a wireless telecommunications network. An operator of a wireless telecommunications network may allow users to access the network in accordance with a service plan, which may specify terms and conditions associated with usage of the network (e.g., types of usage, amounts of usage, geographic areas, associated mobile devices and users, subscription fees, etc.). Customized, user-specific service plans for the wireless network may be generated and implemented by determining that a user satisfies one or more criteria for applying service plan modifications. A user may be required to agree to specified conditions, such as upgrading a mobile device or subscribing for a specified time period, in order to accept a customized service plan. Multiple modifications may be applied to a base service plan, and plans and/or modifications for which the user is eligible may be identified.

20 Claims, 4 Drawing Sheets

(56) References Cited

U.S. PATENT DOCUMENTS

| | | | | |
|---|---|---|---|---|
| 2008/0120174 | A1* | 5/2008 | Li | G06Q 30/02 |
| | | | | 705/14.26 |
| 2009/0186599 | A1* | 7/2009 | Cipoletti | H04W 4/24 |
| | | | | 455/406 |
| 2012/0142310 | A1* | 6/2012 | Pugh | H04L 41/0893 |
| | | | | 455/406 |
| 2013/0132854 | A1* | 5/2013 | Raleigh | G06F 3/0482 |
| | | | | 715/738 |
| 2014/0273942 | A1* | 9/2014 | Rotem | H04W 4/24 |
| | | | | 455/406 |
| 2015/0156335 | A1* | 6/2015 | Gautier | H04W 8/265 |
| | | | | 455/406 |

* cited by examiner

CUSTOMIZED SERVICE PLAN GENERATION

BACKGROUND

Generally described, computing devices can be used to exchange information via a network. Mobile computing devices may utilize a wireless network provided by a service provider to facilitate the exchange of information in accordance with one or more wireless communication protocols. Wireless network service providers may offer network access to users (or potential users) of wireless telecommunications services in the form of service plans, which may include subscription plans, "pay as you go" plans, or other access plans.

Providers of wireless telecommunications services may thus make a number of service plans available, and users of wireless telecommunications services may select an offered service plan to obtain access to the provider's wireless network.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
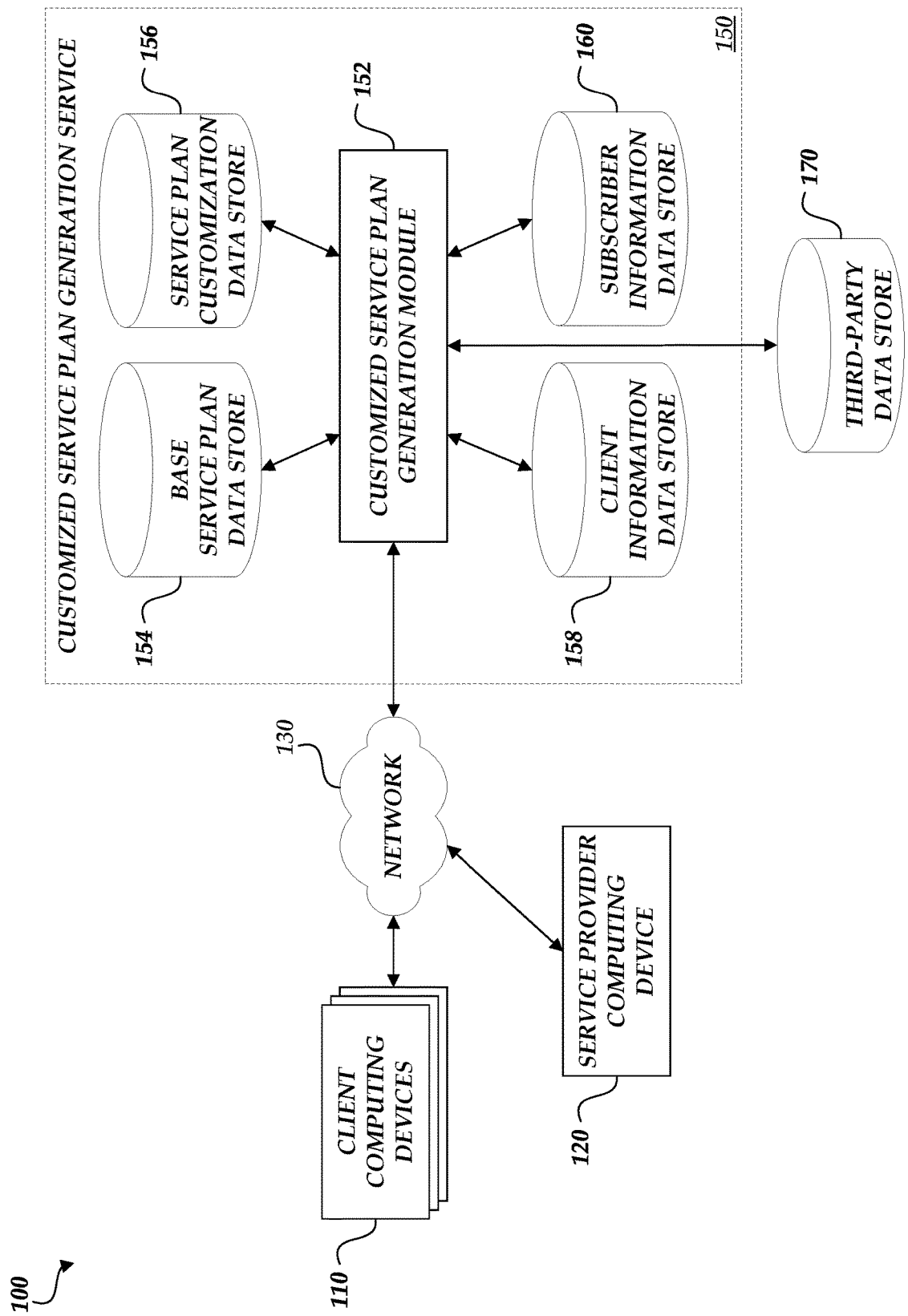
FIG. 1 is a functional block diagram of an example network environment for implementing a customized service plan generation service in accordance with aspects of the present disclosure.

Generally described, aspects of the present disclosure relate to wireless telecommunications networks. More specifically, aspects of the present disclosure are directed to systems, methods, and computer-readable media related to the generation of customized service plans for users of wireless telecommunications networks. Illustratively, users of wireless telecommunications services may access a provider's wireless network by selecting a service plan offered by the provider. Service plans may include subscription-based plans, also known as "post-paid" plans, in which the user receives limited or unlimited access to the provider's wireless network in exchange for a periodic subscription fee. For example, a service plan may include a specified number of minutes of usage of the provider's voice network, a specified amount of data transmitted or received on the provider's data network, a specified bandwidth, a number of text messages, and specified or unlimited amounts of other communications services, for a monthly fee. Service plans may further include "pre-paid" plans, in which the user receives network access on a pay-as-you-go basis. For example, a user may pay a fixed amount to receive 100 minutes of voice service, 4 gigabytes (GB) of high-speed data service, and an unlimited amount of low-speed data service, and may pay further amounts to "top up" or replenish their service amounts as needed. Service plans may further include combinations of pre-paid and post-paid (e.g., a subscription for voice service combined with pay-as-you-go for data) and other models.

Users of wireless telecommunications services may thus include both post-paid subscribers and pre-paid customers, who may select from a number of service plans made available by the service provider. Users may select the available service plan that comes closest to meeting their actual service needs. For example, a user who routinely uses 4-6 GB of wireless data services per month may choose a subscription plan that includes up to 6 GB of data per month, or may choose a prepaid plan that allows them to purchase access to the provider's data network 5 GB at a time. However, the number of service plans made available by the service provider may be limited, and a user may find that none of the available service plans are a good match for their usage. For example, a user may find that their usage varies throughout the year, such that they use 6 GB of data in the summer but only 3 GB per month in the fall, winter, and spring. As a further example, a user may be unaware that upgrading their mobile computing device would result in a better user experience (e.g., due to the newer device having the ability to access higher-speed data networks), or may be aware of this information but nonetheless unable or unwilling to upgrade.

The terms "user," "client," and "customer" may be used interchangeably herein to refer to any individual or entity that uses or requests access to wireless telecommunications services provided by a wireless service provider, or who may potentially use or request access to these services (e.g., potential users or customers). The term "subscriber" may similarly be used to refer to any individual or entity that uses or requests access via a subscription-based service plan. It will be thus understood that subscribers may also be customers, clients, or users, and vice versa, and that the terms may inclusively refer to those who may potentially access wireless networks and services as well as those who currently access these networks and services. It will thus be understood that the embodiments described herein are not limited to any particular type or classification of users or potential users, or to any type or classification of provided services.

It will be understood that the customized service plan generation service described herein addresses a technical problem that specifically arises in the realm of computer networks, and in particular addresses a problem that arises in the realm of wireless telecommunications networks. It will further be understood that the technical problem described herein is not analogous to any pre-Internet practice, and that the customized service plan generation service improves the performance of a wireless telecommunications network by, for example, relating demand for wireless services to the capacity of the wireless network infrastructure. By implementing the customized service plan generation service, a wireless service provider may make more effective use of the provider's wireless network and provide wireless telecommunications services more efficiently.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of this disclosure may include several novel features, no single one of which is solely responsible for its desirable attributes or which is essential to practicing the embodiments of the disclosure herein described.

FIG. 1 is a block diagram of an example network environment 100 for implementing a customized service plan generation service in accordance with aspects of the present disclosure. The network environment 100 may include a number of client computing devices 110 and a service provider computing device 120, which may communicate with a customized service plan generation service 150 via a network 130.

The client computing devices 110 may illustratively be any computing devices that implement aspects of the present disclosure, such as communicating with a customized service plan generation service 150. The client computing devices 110 can include, for example, desktop computers, server computers, laptops, tablets, personal digital assistants (PDAs), mobile phones, electronic book readers, other wireless handheld devices, set-top or other television boxes, media players, video game platforms, kiosks, glasses or other wearable devices, or any other device with a hardware processor. The client computing devices 110 may each be associated with a respective user (or, in some embodiments, a potential user) of wireless telecommunications services. In some embodiments, some or all of the client computing devices 110 may be mobile computing devices, which may be operable to utilize the wireless telecommunications services described herein.

The network environment 100 may further include a service provider computing device 120, which may similarly be any computing device associated with the service provider that implements aspects of the present disclosure. For example, the service provider may use a service provider computing device 120 to create, modify, or delete service plan customization criteria, service plan modifications, or base service plans, to create or update user information or subscriber information, and the like.

The network environment 100 may further include a network 130. The network 130 may illustratively be any wired or wireless network, or combination thereof. In addition, the network 130 may include, but is not limited to, a cellular telecommunications network, Wi-Fi network, cable network, satellite network, mesh network, personal area network, local area network (LAN), wide area network (WAN), public or private intranet, the Internet, or other public or private communications network or networks, or any combination thereof. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or some other type of wireless network. The network 130 may use protocols and components for communicating via the Internet or any of the other aforementioned types of networks. In some embodiments, the network 130 may be omitted, and one or more of the client computing devices 110, service provider computing device 120, or customized service plan generation service 150 may communicate directly with each other. Additionally, in some embodiments, the network 130 may be the wireless telecommunications network provided by the wireless service provider.

The network environment 100 may further include a customized service plan generation service 150, which is described in more detail below with reference to FIG. 4. The customized service plan generation service 150 may include a customized service plan generation module 152, which may implement aspects of the present disclosure such as the customized service plan generation routine 300 described below with reference to FIG. 3. The customized service plan generation service 150 may further include a number of data stores, such as a base service plan data store 154, a service plan customization data store 156, a client information data store 158, and a subscriber information data store 160.

The data stores 154, 156, 158, and 160 may illustratively be any non-transient computer-readable media, including but not limited to hard drives, solid state devices, flash memories, EEPROMs, or other storage media accessible to or by a device such as an access device, server, or other computing device. In various embodiments, the data stores 154, 156, 158, and 160 may be implemented as a database, database server, a component of another server or service (e.g., the service provider computing device 120), or as more or fewer data stores than are depicted in the example embodiment. For example, the base service plan data store 154 and the service plan customization data store 156 may be combined into a single data store, or the client information data store 158 and the subscriber information data store 160 may be combined. A data store may also or alternatively be distributed or partitioned across multiple local and/or remote storage devices as is known in the art without departing from the scope of the present disclosure. In yet other embodiments, a data store may include or be embodied in a data storage web service.

The base service plan data store 154 may illustratively store data regarding base service plans (e.g., service plans that have not been customized for any particular user), as described above. For example, a base service plan may be stored that includes a specified amount of usage of high-speed wireless data services per month, unlimited usage of low-speed wireless data services, unlimited usage of wireless voice services within specified geographic regions (e.g., the United States and Canada), specified rates for using wireless voice services to communicate with parties in other geographic regions, and a specified monthly subscription fee. The service plan customization data store 156 may store criteria and associated modifications for customizing the base service plans. For example, the service plan customization data store 156 may store criteria that are met by a user who is subscribing to a particular service plan and porting in a telephone number from a third party, and the associated modification may be to increase the amount of high-speed data usage included in the service plan by 1 GB. In some embodiments, criteria and modifications may be received from the service provider computing device 120 and stored in the service plan customization data store 156.

The client information data store 158 may store information regarding current or potential users of wireless services, and the subscriber information data store 160 may store information regarding subscribers to wireless services. In some embodiments, the client information data store 158 and the subscriber information data store 160 may store different sets of information regarding the same user or users. For example, the client information data store 158 may store information regarding a user's interaction with a web server, and the subscriber information data store 160 may store information such as a user's billing address, payment method, and the like. In some embodiments, the client information data store 158 and/or subscriber information data store 160 may store information that is obtained from the network of the wireless service provider, such as information related to usage of various wireless services or geographic regions in which usage occurred. In further embodiments, the client information data store 158 may store information regarding potential customers of the wireless services, including potential customers or prospects who are not current or former users of wireless services, and for whom no data is available from the subscriber information data store 160. In such embodiments, information regarding these potential customers or non-customers may be obtained from, e.g., the wireless provider's customer-facing web sites, third-party sources, or other data sources.

In some embodiments, the customized service plan generation service 150 may communicate with one or more third-party data stores 170, which may be implemented in similar fashion to the data stores 154, 156, 158, and 160. In further embodiments, the customized service plan generation service 150 may communicate with a third-party data store 170 via the network 130 or via a different network. Third-party data stores 170 may store information such as user demographics, estimated probabilities of user churn, and other such information.

It will be understood that the network environment 100 may include more (or fewer) elements than those shown in FIG. 1. It is not necessary, however, that all of these elements be shown in order to provide an enabling disclosure. For example, the network environment 100 may include elements of the provider's wireless telecommunications network, such as billing or provisioning platforms, and all or part of the customized service plan generation service 150 may be implemented as components of these platforms. As further examples, the network environment 100 may include third-party computing devices, customer care agent computing devices, or other computing devices that communicate with the customized service plan generation service 150. The network environment 100 depicted in FIG. 1 is thus understood to be illustrative and not limiting.

Figure 2:
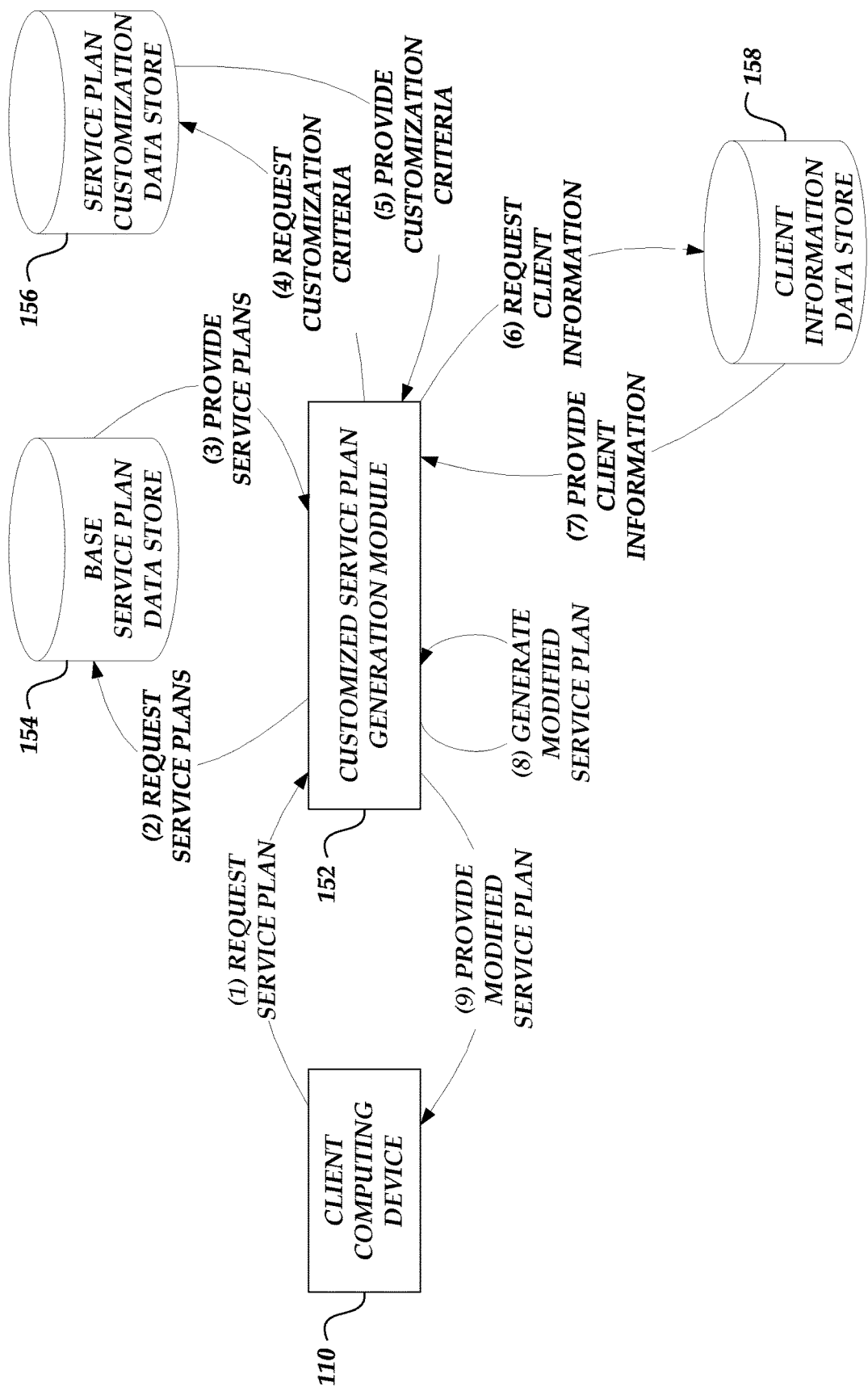
FIG. 2 is a block diagram depicting example interactions for generating customized service plans in accordance with aspects of the present disclosure.

FIG. 2 is a block diagram depicting generation of customized service plans in the network environment 100 of FIG. 1 in accordance with aspects of the present disclosure. At (1), a client computing device 110 may request a customized service plan from the customized service plan generation module 152. In some embodiments, the client computing device 110 may request a service plan, and the customized service plan generation module 152 or another module may determine that a customized service plan should be generated. In other embodiments, another computing device (e.g., the service provider computing device 120 or a third-party computing device) may request generation of a customized service plan, or may perform some other interaction (e.g., sending or updating service plan customization criteria) that causes generation of a customized service plan.

At (2), the customized service plan generation module 152 may request one or more base service plans from the base service plan data store 154. A "base service plan," as described above, may generally refer to a service plan that the wireless service provider makes available to customers and/or subscribers generally, without any per-client customization. In some embodiments, the customized service plan generation module 152 may identify a client or account associated with the client computing device 110 (or a client or account may be identified in the request received from the client computing device 110), and the customized service plan generation module 152 may request a service plan associated with that client or account. At (3), the base service plan data store 154 may provide one or more base service plans in response to the request.

At (4), the customized service plan generation module 152 may request criteria for modifying service plans from the service plan customization data store 156. In some embodiments, as described above, the customized service plan generation module 152 may receive criteria from a computing device, such as the service provider computing device 120 of FIG. 1, and may instead store the received criteria at (4). At (5), the service plan customization data store 156 may provide the requested criteria. The provided criteria may, in some embodiments, be associated with a particular service plan modification or modifications, which may additionally be requested and provided at (4) and (5). For example, a criterion may indicate that clients using a particular mobile computing device to access the wireless network are eligible for a service plan modification that increases the amount of data usage covered by the service plan. As a further example, a criterion may specify that clients associated with a particular geographic region are eligible for a customization that provides a one-time discount on upgrading to a particular mobile computing device or devices, or on initiating service (e.g., becoming a customer) with the particular mobile computing device or devices. The wireless service provider may specify such a criterion, for example, if the provider's network has capacity in the geographic region that can only be utilized by certain devices. The service provider may thus encourage clients to upgrade to such devices and thereby make more efficient use of the service provider's network.

In various embodiments, service plan modification criteria may include various characteristics or other qualifications that users must meet in order to be eligible for the associated service plan modification. For example, the criteria may specify that users associated with a particular mobile computing device are eligible for a customization, that users with certain payment histories (e.g., frequently paying their bills on time, frequently not paying their bills on time, frequently incurring overage fees, etc.) are eligible, that users who pay with a particular payment method (e.g., paper checks, debit cards, etc.) are eligible, that users who have ported telephone numbers from other wireless service providers are eligible, that users who make frequent or infrequent use of customer care services are eligible, and so forth. In some embodiments, the criteria may further specify conditions that a user must agree to in order to be eligible for the service plan modification, such as upgrading to a new mobile computing device, subscribing to a service plan for a specified time period, switching to paperless billing or automatic bill pay, adding an additional user or device to the service plan, providing additional information (e.g., filling out a survey or providing an email address) and the like.

At (6), the customized service plan generation module 152 may request information regarding the user from the client information data store 158. Information regarding the user may include, for example, information regarding the user's usage of wireless services, activity on a service provider web site (e.g., that the user has visited a web site that provides information about available wireless services, service plans, and/or devices), billing history, demographic information, or any other information that can be used to determine whether the user satisfies a service plan customization criterion. At (7), the client information data store 158 may provide the requested information.

With reference again to FIG. 1, in some embodiments, the customized service plan generation module 152 may request information regarding the user from other data stores, such as the subscriber information data store 160 or a third-party data store 170, in addition to or instead of the client information data store 158. Such information may include, for example, information obtained or derived from the service provider's wireless network, such as the types of network services used by the user, the amount of such usage, a pattern of usage (e.g., that the user makes greater use of wireless data services on weekends), and the like. As a further example, the information may include third-party estimates of whether a user is likely to "churn" or change wireless service providers, based on characteristics such as numbers ported from another service provider, gaps in the user's service history (e.g., that the user was a subscriber, ceased to be one for a period of time, and then returned to being a subscriber), characteristics of or changes to the user's service plan, and so forth.

Returning to FIG. 2, at (8), the customized service plan generation module 152 may generate one or more customized service plans. Illustratively, the customized service plan generation module 152 may generate a customized service plan by determining, based on the information regarding the user, whether the user satisfies one or more of the customization criteria, and if so applying the associated customization(s) to a base service plan. In some embodiments, the customized service plan generation module 152 may generate multiple customized service plans by applying various combinations of customizations and base service plans.

At (9), the customized service plan generation module 152 may provide the generated customized service plan to the client computing device 110. In some embodiments, the customized service plan generation module 152 may instead provide the customized service plan to other computing devices, such as a computing device operated by a customer care agent, retail sales agent, or other agent of the service provider. In further embodiments, the customized service plan generation module 152 may provide the customized service plan to a service provider computing device (e.g., the service provider computing device 120 of FIG. 1), which may implement the customized service plan in the service provider's network. The service provider computing device may, in various embodiments, implement the customized service plan automatically, implement the customized service plan after prompting the client and receiving client approval, or may otherwise process or analyze the customized service plan to determine, for example, whether it reduces estimated churn rates, increases network utilization, or meets other criteria.

It will be understood that FIG. 2 is provided for purposes of example, and that the interactions depicted may be varied within the scope of the present disclosure. For example, the interactions at (2), (4), and (6) may be carried out in any order relative to each other, or in parallel. As a further example, the interaction at (2) may be omitted, and the customized service plan generation module 152 may determine which service plan modifications may be offered to a particular client rather than generating a modified service plan. FIG. 2 is thus understood to be illustrative and not limiting.

Figure 3:
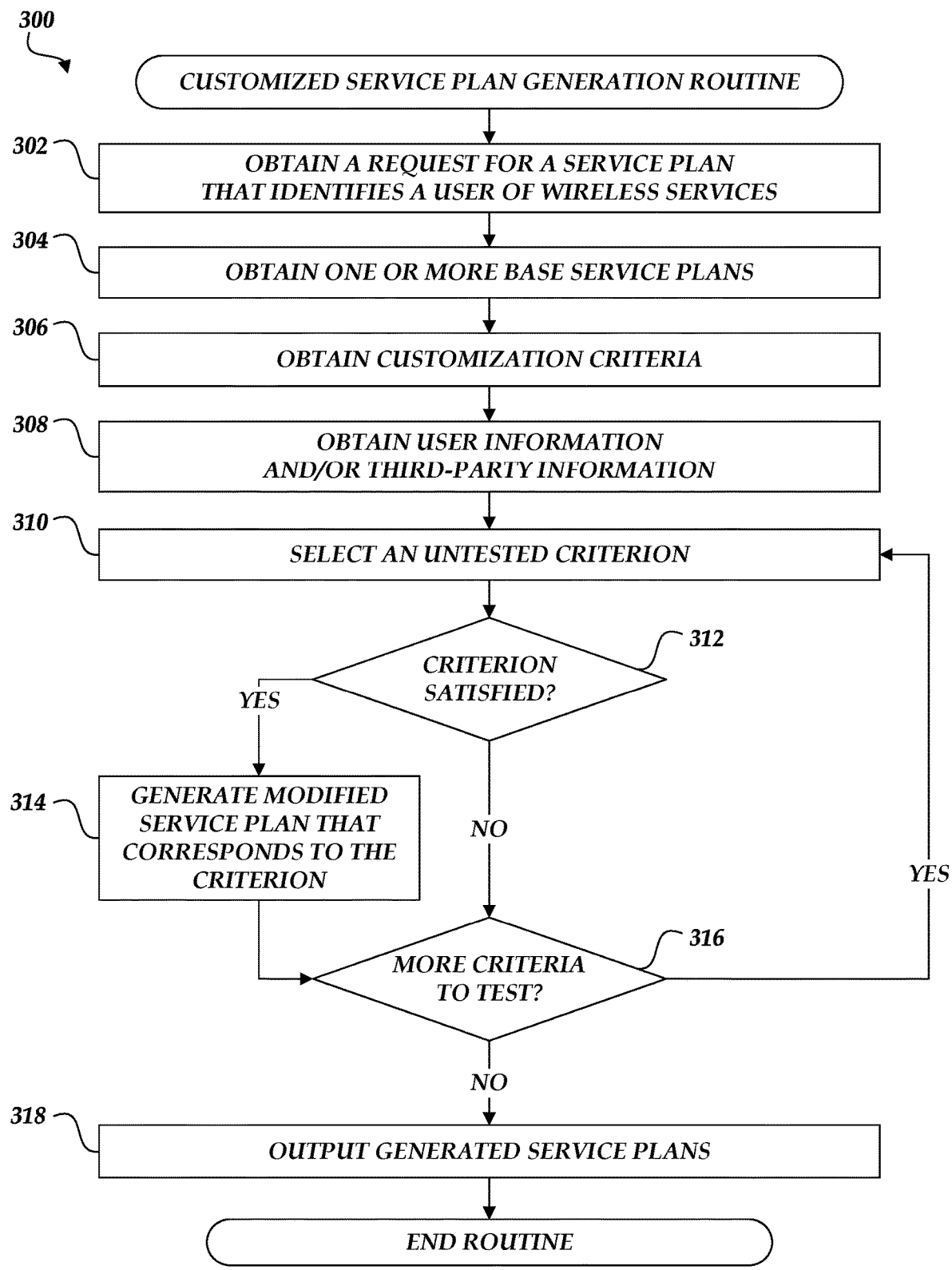
FIG. 3 is a flow diagram depicting an example customized service plan generation routine that is illustratively implemented in the network environment of FIG. 1.

FIG. 3 is a flow diagram depicting an example customized service plan generation routine 300 that may be implemented in accordance with aspects of the present disclosure. The routine 300 may be implemented, for example, by the customized service plan generation service 150 of FIG. 2, or by a module or component of the customized service plan generation service 150, such as the customized service plan generation module 152. At block 302, a request for a service plan may be obtained. The request may, in various embodiments, be a request for a base service plan, a customized service plan, or any combination thereof. The request may, in some embodiments, identify a user (or potential user) for whom a customized service plan is to be generated. In some embodiments, as described above, information may be obtained instead of or in addition to the request, such as information regarding new or changed base service plans, service plan modification criteria, or information regarding users or potential users.

At block 304, one or more base service plans may be obtained. Illustratively, a base service plan associated with the identified user may be obtained, such as a service plan to which the user currently subscribes. In some embodiments, a determination may be made regarding a set of base service plans for which the user is eligible. For example, a base service plan may be associated with a particular geographic region, and may only be offered to users within the geographic region. As a further example, a base service plan may only be available to users having certain attributes or characteristics, such as a high credit rating, a particular mobile computing device, or a minimum number of mobile computing devices. As described above, the base service plans may correspond to service plans that the service provider makes generally available.

At block 306, service plan customization criteria may be obtained. As described above, individual criteria or particular sets of criteria may be associated with a particular service plan modification, such that a user who satisfies the criteria is eligible for a modified service plan that incorporates the modification. In some embodiments, a subset of the available customization criteria may be obtained based on characteristics of the user, such as a geographic region associated with the user or a mobile computing device associated with the user.

At block 308, information regarding the user may be obtained. As described above, information regarding the user may be obtained from the service provider's wireless networks, billing systems, web servers, or other platforms or services, as well as third-party data sources and analyses. For example, information regarding the user may be obtained from a data store, such as the client information data store 158, subscriber information data store 160, or third-party data store 170 depicted in FIG. 1. Information regarding the user may include, for example, usage information, billing information, mobile device information, or other information as described above.

At block 310, an untested service plan customization criterion may be selected. In some embodiments, a service plan modification may be associated with multiple criteria (e.g., that a user has been a subscriber for at least one year and ported in a telephone number), in which case the multiple criteria may be selected. At decision block 312, a determination may then be made as to whether the criterion or criteria are satisfied. For example, the selected criteria may specify that the user must be associated with a particular geographic region and a mobile computing device that lacks certain features, and the determination may be that the user satisfies these criteria. If the determination is that the criterion or criteria are satisfied, then at block 314 a modified or customized service plan may be generated. Illustratively, the modified service plan may be generated by applying the service plan modification associated with the criteria to a base service plan. In some embodiments, as described above, a list of service plan modifications may be generated rather than generating a modified service plan or plans.

At decision block 316, a determination may be made as to whether all of the service plan customization criteria have been tested. If not, the routine 300 branches to block 310, where another untested criterion may be selected. The routine 300 then iterates through blocks 312, 314, and 316 until all criteria have been tested, at which point the routine 300 branches to block 318, where the generated service plans (or, in some embodiments, the list of allowed service plan modifications) may be output. In various embodiments, a single service plan that includes one or more modifications, one or more service plans that each include a single modification, or any combination thereof may be output.

In various embodiments, the blocks of routine 300 may be combined, omitted, or carried out in various orders. For example, blocks 302, 304, 306, and 308 may be carried out in any order, or in parallel. As a further example, block 304 may be omitted, and the routine 300 may identify service plan modifications as described above. The routine 300 is thus understood to be illustrative and not limiting.

Figure 4:
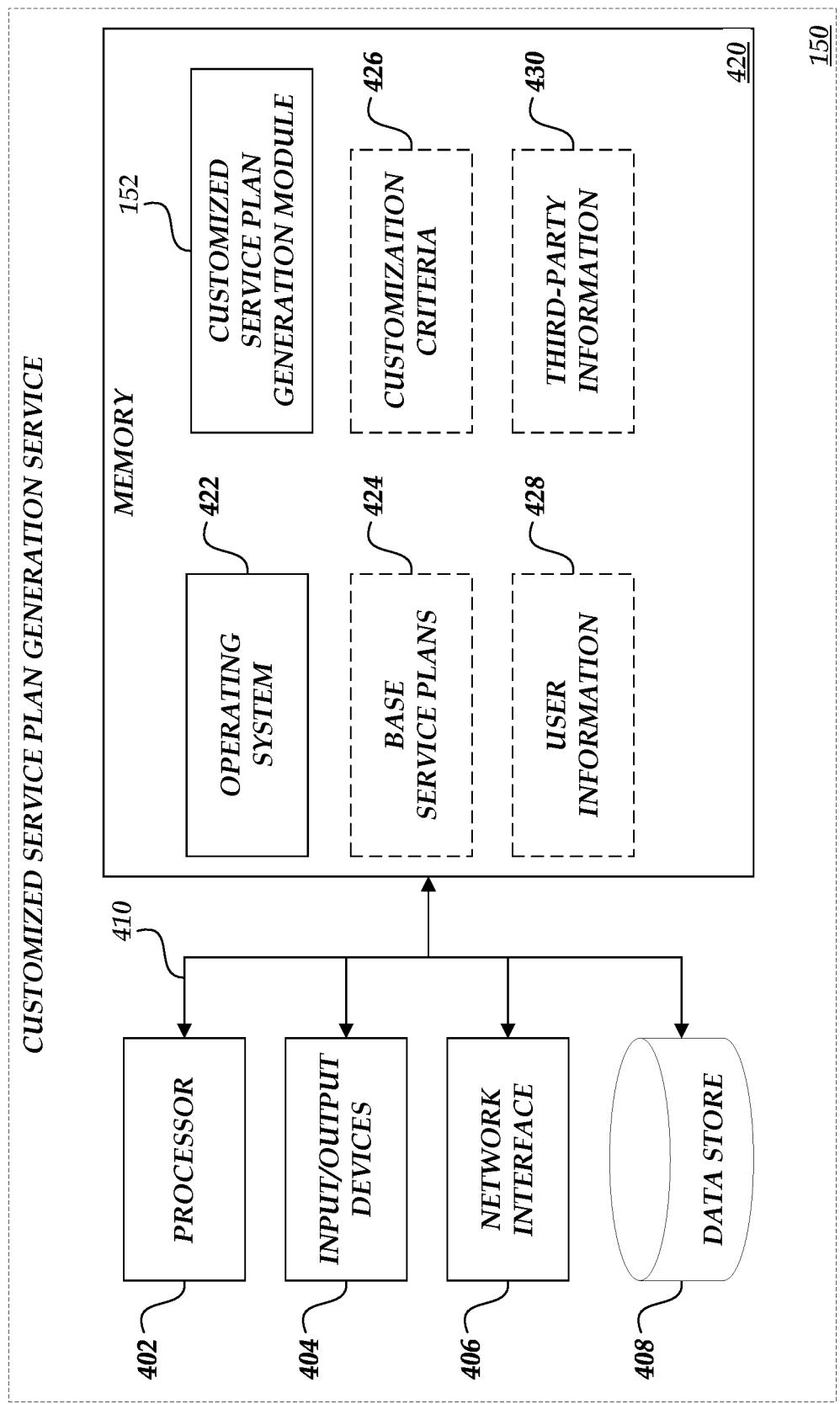
FIG. 4 is a functional block diagram of an example computing device for implementing a customized service plan generation service in the network environment of FIG. 1.

FIG. 4 depicts a general architecture of the customized service plan generation service 150, which includes an arrangement of computer hardware and software components that may be used to implement aspects of the customized service plan generation service 150. The customized service plan generation service 150 may include many more (or fewer) elements than those shown in FIG. 4. It is not necessary, however, that all of these elements be shown in order to provide an enabling disclosure.

As illustrated, the customized service plan generation service 150 includes a processor 402, input/output devices 404, a network interface 406, and a data store 408, all of which may communicate with one another by way of a communication bus 410. The network interface 406 may provide connectivity to one or more networks (such as network 130) or computing systems and, as a result, may enable the customized service plan generation service 150 to receive and send information and instructions from and to other computing systems or services, such as client computing devices 110 or a service provider computing device 120. In some embodiments, the customized service plan generation service 150 may be configured to process requests from client computing devices 110 or a service provider computing device 120, such as requests to generate customized service plans.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the customized service plan generation service 150. The memory 420 may further store specific computer-executable instructions and other information (which may be referred to herein as "modules") for implementing aspects of the present disclosure. For example, the memory 420 may include a customized service plan generation module 152, which may perform various operations with regard to displaying the user interfaces described herein. For example, the customized service plan generation module 152 may carry out the interactions described above with reference to FIG. 2. As a further example, the customized service plan generation module 152 may carry out the customized service plan generation routine 300 depicted in FIG. 3.

The memory 420 may further include base service plans 424, customization criteria 426, user information 428, and/or third-party information 430, which may be loaded into the memory 420 as various operations are performed. In some embodiments, one or more of the base service plans 424, customization criteria 426, user information 428, or third-party information 430 may be obtained from external data stores (such as the third-party data store 170) either directly, via the network 130, or via another network. In other embodiments, one or more of the base service plans 424, customization criteria 426, user information 428, or third-party information 430 may be obtained from the data store 408.

While the operating system 422 and customized service plan generation module 152 are illustrated as distinct modules in the memory 420, in some embodiments, the customized service plan generation module 152 may be incorporated as a module in the operating system 422 or another application or module, and as such, separate modules may not be required to implement some embodiments.

It will be recognized that many of the components described in FIG. 4 are optional and that embodiments of the customized service plan generation service 150 may or may not combine components. Furthermore, components need not be distinct or discrete. Components may also be reorganized. For example, the customized service plan generation service 150 may be represented in a single physical device or, alternatively, may be split into multiple physical devices. In some embodiments, components illustrated as part of the customized service plan generation service 150 (such as the data store 408) may additionally or alternatively be included in other computing devices, such that some aspects of the present disclosure may be performed by the customized service plan generation service 150 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
    a data store configured to store information regarding one or more users of wireless telecommunications services, service plan customization criteria, and computer-executable instructions; and
    a processor in communication with the data store, wherein the computer-executable instructions, when executed by the processor, configure the processor to:
        receive, from a target computing device, a request to generate a wireless telecommunications service plan for a first user of the one or more users;
        obtain, from the data store, a service plan customization criterion and information regarding the first user, wherein the service plan customization criterion is associated with a service plan modification;
        determine, based at least in part on the information regarding the first user, that the first user satisfies the service plan customization criterion; and
        in response to the determination that the first user satisfies the service plan customization criterion:
            obtain, without user input, a base wireless telecommunications service plan for the first user;
            generate a modified wireless telecommunications service plan based at least in part on the base service plan and the service plan modification; and
            transmit the modified wireless telecommunications service plan to the target computing device in response to the request.

2. The system of claim 1, wherein the processor is further configured to identify the base wireless telecommunications service plan based at least in part on the information regarding the first user.

3. The system of claim 1, wherein the modified wireless telecommunications service plan is associated with a condition that the first user must satisfy in order to accept the modified wireless telecommunications service plan.

4. The system of claim 3, wherein the condition comprises one or more of upgrading to a specified mobile computing device, subscribing for a specified time period, adding an additional user to the modified wireless telecommunications service plan, adding a mobile computing device to the modified wireless telecommunications service plan, providing additional information regarding the first user, scheduling automatic payment, or agreeing to receive information electronically.

5. The system of claim 1, wherein the information regarding the first user comprises one or more of a mobile computing device, a service plan, an amount of usage of the wireless telecommunications services, a type of usage of the wireless telecommunications services, a payment history, a method of payment, an amount of usage of customer support resources, or an indication that the first user has ported a telephone number from a different provider of wireless telecommunications services.

6. A computer-implemented method under control of a processor executing specific computer-executable instructions, the computer-implemented method comprising:
    obtaining a service plan customization criterion, wherein the service plan customization criterion is associated with a service plan modification;
    obtaining information regarding users of a wireless telecommunications service;
    determining, based at least in part on the information regarding the users of the wireless telecommunications service, that one or more users satisfy the service plan customization criterion; and in response to determining that the one or more users satisfy the service plan customization criterion:
obtaining, without user input, a base wireless telecommunications service plan for each of the one or more users; and
applying the service plan modification to the base wireless telecommunications service plan for at least one user of the one or more users to generate a modified wireless telecommunications service plan for the at least one user.

7. The computer-implemented method of claim 6 further comprising:
transmitting, to a computing device associated with the at least one user, an indication that the service plan modification is available.

8. The computer-implemented method of claim 7 further comprising:
receiving, from the computing device associated with the at least one user, an indication that the at least one user accepts the service plan modification.

9. The computer-implemented method of claim 6, wherein the information regarding the users of the wireless telecommunications service is obtained from a third party.

10. The computer-implemented method of claim 6, wherein the information regarding the users of the wireless telecommunications service includes one or more of an amount of usage of the wireless telecommunications service, a pattern of usage of the wireless telecommunications service, an amount of usage of a different service, or a likelihood that the at least one user will discontinue usage of the wireless telecommunications service.

11. The computer-implemented method of claim 6, wherein the service plan customization criterion is associated with a geographic region, and wherein identifying the one or more users that satisfy the service plan customization criterion comprises determining that the one or more users are associated with the geographic region.

12. The computer-implemented method of claim 6, wherein the at least one user is a potential user of the wireless telecommunications service.

13. The computer-implemented method of claim 6, wherein the service plan modification comprises one or more of providing a one-time discount, providing a discount for a specified number of billing periods, increasing or decreasing an amount of usage that is included in the base wireless telecommunications service plan, adding a user to the base wireless telecommunications service plan, adding a mobile computing device to the base wireless telecommunications service plan, upgrading a mobile computing device associated with the base wireless telecommunications service plan, or increasing or decreasing a bandwidth associated with the base wireless telecommunications service plan.

14. The computer-implemented method of claim 6, wherein the service plan modification is a first service plan modification, the computer-implemented method further comprising:
obtaining a second service plan customization criterion, wherein the second service plan customization criterion is associated with a second service plan modification;
determining that the at least one user satisfies the second service plan customization criterion; and
in response to the determination that the at least one user satisfies the second service plan customization criterion, applying the second service plan modification to the base wireless telecommunications service plan for the at least one user.

15. The computer-implemented method of claim 14 further comprising transmitting the first service plan modification and the second service plan modification to a computing device associated with the at least one user.

16. A non-transitory, computer-readable medium containing computer-executable instructions that, when executed by a processor, configure the processor to:
obtain a plurality of service plan customization criteria;
obtain information regarding a first user of a wireless telecommunications service;
determine, based at least in part on the information regarding the first user, that the first user satisfies one or more criteria out of the plurality of service plan customization criteria; and
in response to the determination that the first user satisfies the one or more criteria:
identify, based at least in part on the one or more criteria that the first user satisfies, one or more service plan modifications that the first user is eligible to receive;
obtain, without user input, a base wireless telecommunications service plan associated with the first user; and
apply at least one service plan modification of the one or more service plan modifications to the base wireless telecommunications service plan associated with the first user to generate a modified wireless telecommunications service plan.

17. The non-transitory, computer-readable medium of claim 16, wherein the processor is further configured to transmit, to a computing device associated with the first user, the one or more service plan modifications that the first user is eligible to receive.

18. The non-transitory, computer-readable medium of claim 17, wherein the processor is further configured to receive, from the computing device associated with the first user, an indication that the first user has selected the at least one service plan modification.

19. The non-transitory, computer-readable medium of claim 16, wherein the processor is further configured to determine the base wireless telecommunications service plan based at least in part on the information regarding the first user.

20. The non-transitory, computer-readable medium of claim 16, wherein the information regarding the first user comprises information regarding a mobile computing device associated with the first user.

* * * * *